United States Patent
Ida et al.

(10) Patent No.: US 12,441,009 B2
(45) Date of Patent: Oct. 14, 2025

(54) VERTICAL ARTICULATED ROBOT

(71) Applicant: NACHI-FUJIKOSHI CORP., Tokyo (JP)

(72) Inventors: Shinya Ida, Toyama (JP); Hiroki Iida, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 0 days.

(21) Appl. No.: 18/621,101

(22) Filed: Mar. 29, 2024

(65) Prior Publication Data

US 2024/0342930 A1    Oct. 17, 2024

(30) Foreign Application Priority Data

Apr. 11, 2023   (JP) .................................. 2023-064519

(51) Int. Cl.
| | | |
|---|---|---|
| B25J 17/00 | (2006.01) | |
| B25J 17/02 | (2006.01) | |
| B25J 18/00 | (2006.01) | |

(52) U.S. Cl.
CPC ............. B25J 17/025 (2013.01); B25J 18/00 (2013.01)

(58) Field of Classification Search
CPC . B25J 17/025; B25J 18/00; B25J 17/02; B25J 17/00
See application file for complete search history.

(56) References Cited

U.S. PATENT DOCUMENTS

| | | | | |
|---|---|---|---|---|
| 8,678,969 B2* | 3/2014 | Sato | ........................ | B60L 50/00 |
| | | | | 475/150 |
| 2002/0057955 A1* | 5/2002 | Tsubota | ............ | H01L 21/67766 |
| | | | | 414/1 |
| 2005/0133305 A1* | 6/2005 | Okada | ..................... | F16N 31/00 |
| | | | | 184/65 |
| 2009/0114053 A1* | 5/2009 | Mikaelsson | ............ | B25J 9/0009 |
| | | | | 901/42 |
| 2012/0321426 A1* | 12/2012 | Tanaka | ..................... | B25J 9/047 |
| | | | | 414/728 |
| 2016/0031094 A1* | 2/2016 | Tsutsumi | ............. | B25J 19/0008 |
| | | | | 901/21 |
| 2019/0061145 A1* | 2/2019 | Ohtsubo | ................ | B25J 9/0024 |
| 2020/0122343 A1* | 4/2020 | Oikawa | ...................... | B25J 9/08 |
| 2020/0238544 A1* | 7/2020 | Shiramatsu | ......... | F16H 57/0464 |

(Continued)

FOREIGN PATENT DOCUMENTS

JP         2021180324 A        11/2011

*Primary Examiner* — Zakaria Elahmadi
(74) *Attorney, Agent, or Firm* — Apex Juris, pllc; Tracy M Heims

(57) ABSTRACT

A vertical articulated robot has a base installed on a mounting surface, a first axis supported parallel to the mounting surface by the base, a pivot frame rotatable by the first axis, a second axis supported orthogonal to the first axis by the pivot frame, a lower arm rotatable by the second axis, a third axis supported parallel to the second axis by an end of the lower arm opposite to the second axis, a connecting arm rotatable by the third axis, a fourth axis supported orthogonal to the second axis and third axis by the connecting arm, and an upper arm including a holding arm rotatable by the fourth axis, and the first axis enables the second axis, the lower arm, the third axis, and the upper arm to make a substantially vertical circular motion relative to the mounting surface.

2 Claims, 5 Drawing Sheets

(56) References Cited

U.S. PATENT DOCUMENTS

| | | | |
|---|---|---|---|
| 2021/0146393 A1* | 5/2021 | Yoshino | B25J 9/0084 |
| 2023/0219409 A1* | 7/2023 | Okuda | B60K 7/0007 |
| | | | 180/65.6 |
| 2023/0271214 A1* | 8/2023 | Yoshino | B25J 9/0093 |

* cited by examiner

VERTICAL ARTICULATED ROBOT

CROSS-REFERENCE TO RELATED APPLICATION

This application is based upon and claims the benefit of priority from the prior Japanese Patent Application No. 2023-064519, filed on Apr. 11, 2023, the entire contents of which are incorporated herein by reference.

BACKGROUND OF THE INVENTION

Field of the Invention

This invention relates to a vertical articulated robot equipped with multiple arms.

Description of the Related Art

Conventionally, as robots for transporting substrates, SCARA robots (horizontal articulated robots) are often adopted (for example, see Japanese Provisional Patent Publication No. 2021-180324). SCARA robots generally have two to three axes for horizontal movement and one axis for vertical movement. Since SCARA robots are often limited in their usage, it is common to design dedicated machines tailored to specific applications.

SUMMARY OF THE INVENTION

DESCRIPTION OF THE EMBODIMENTS

Figure 1:
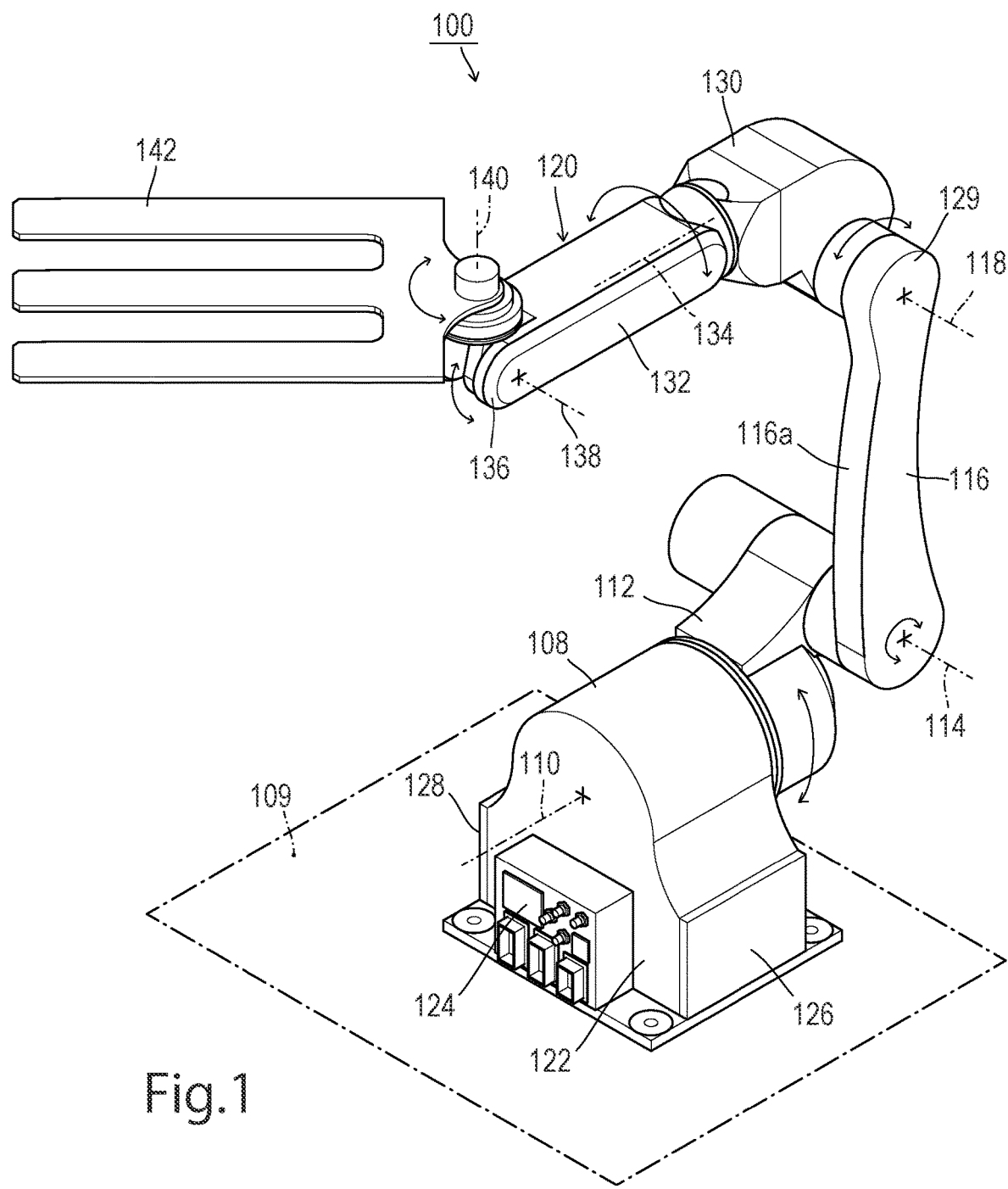
FIG. 1 is a perspective view showing the overall configuration of a vertical articulated robot in an embodiment of the present invention.

A preferred embodiment of the present invention will be described in details below with reference to the accompanying drawings. Dimensions, materials, and other specific values described in such embodiments are merely illustrative to facilitate understanding of the invention and do not limit the invention unless specifically stated otherwise. Furthermore, elements having substantially the same function and configuration in this specification and drawings are denoted by the same reference numerals to omit redundant descriptions, and elements not directly related to the present invention are omitted from the drawings.

Figure 3:
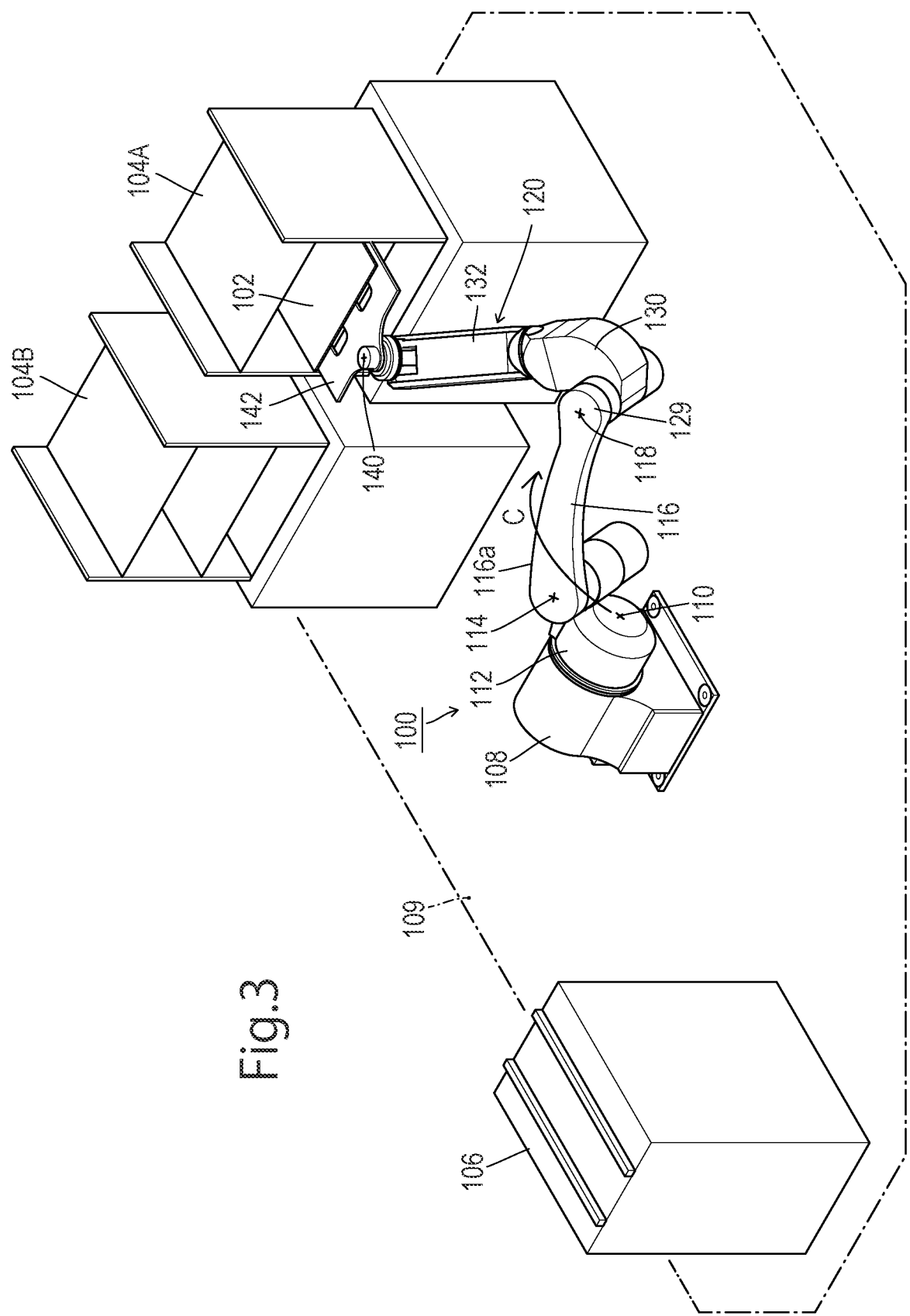
FIG. 3 is a diagram illustrating the operation of the vertical articulated robot in FIG. 1.

FIG. 1 is a perspective view showing the overall configuration of a vertical articulated robot 100 according to an embodiment of the present invention. The vertical articulated robot 100 is an industrial robot, which is used, for example, to store a substrate (work piece 102) in racks 104A and 104B as shown in FIG. 3 or to transport the work piece 102 from racks 104A and 104B to a stage 106.

To briefly explain, the vertical articulated robot 100 is a general vertical articulated robot with modifications of the first axis having a different rotational direction and a primary operating range of the lower arm and upper arm directing upward. The vertical articulated robot 100, for example, is a six-axis robot that includes a base 108, a first axis 110, a pivot frame 112, a second axis 114, a lower arm 116, a third axis 118, and an upper arm 120. As will be described later, the upper arm 120 has a connecting arm 130, a fourth axis 134, and a holding arm 132 and rotates by the third axis 118 and the fourth axis 134 as a whole.

A base 108 is mounted on the floor of a factory or the like. A connector 124 to which a harness is connected is attached to a side surface 122 of the base 108. Here, the connector 124 can also be attached to other side surfaces 126 and 128 of the base 108 in consideration of the direction in which the harness is pulled out.

The first axis 110 is supported in a direction parallel (hereinafter referred to as a horizontal direction) to a mounting surface 109 when the base 108 is placed on the floor. The pivot frame 112 rotates about the first axis 110. The second axis 114 is supported in a direction orthogonal to the first axis 110 by the pivot frame 112. The lower arm 116 rotates about the second axis 114. In other words, the rotation direction of the second axis 114 is a direction in which an angle formed between the lower arm 116 and the first axis 110 changes. The third axis 118 is supported parallel to the second axis 114 by the distal end 129 of the lower arm 116 that is positioned at an opposite side of the second axis 114.

The upper arm 120 has the connecting arm 130, the fourth axis 134, and the holding arm 132 and rotates about the third axis 118 and the fourth axis 134 as a whole. The connecting arm 130 is rotatably connected to the lower arm 116 via the third axis 118. The holding arm 132 is rotatably connected to the connecting arm 130 via the fourth axis 134 that is extending in the longitudinal direction of the holding arm 132, allowing rotation about the fourth axis 134 as if twisting relative to the connecting arm 130.

Furthermore, a hand 142 serving as an end effector is attached to a distal end 136 of the holding arm 132 via a fifth axis 138 and a sixth axis 140. The hand 142 places a work piece 102 (substrate, etc.) thereon. The fifth axis 138 and the sixth axis 140 are supported in a direction orthogonal to the fourth axis 134 by the distal end 136 of the holding arm 132. Thus, the hand 142 can maintain a freely insertable posture with respect to the work 102 stored in racks 104A and 104B (see FIG. 3).

Thus, the vertical articulated robot 100 is configured to arrange the first axis 110 horizontally so that the pivot frame 112 rotates substantially vertically with respect to the mounting surface 109. This enables the axes and arms from the second axis 114 onward to perform circular motion in a substantially vertical direction with respect to the mounting surface 109 due to the first axis 110.

Figure 2A:
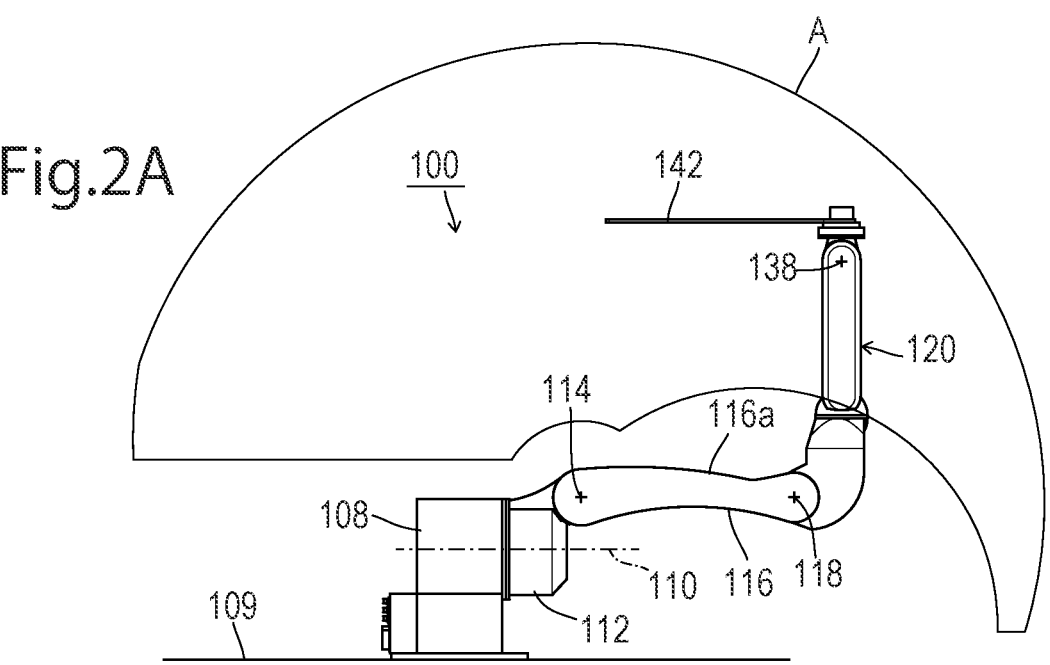
FIG. 2A is a diagram illustrating the range of motion A of the vertical articulated robot in FIG. 1.
Figure 2B:
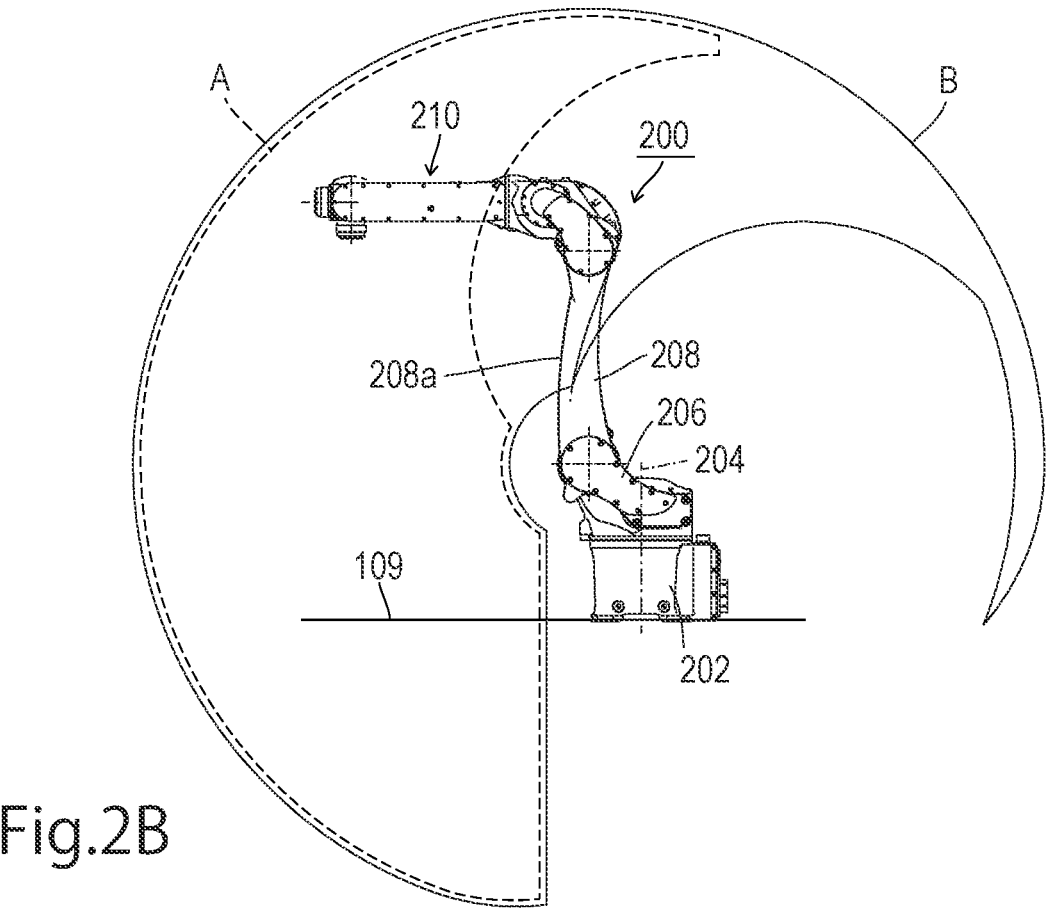
FIG. 2B is a diagram illustrating the range of motion B of a conventional (normal) vertical articulated robot.

FIG. 2A illustrates the range of motion A of the vertical articulated robot 100 in this embodiment, and FIG. 2B illustrates the range of motion B of a conventional (normal) vertical articulated robot 200.

First, referring to FIG. 2B, in the conventional vertical articulated robot 200, the first axis 204 supported by the base 202 is a vertical axis with respect to the mounting surface 109, and the pivot frame 206 rotates about the first axis 204 in a plane parallel to the mounting surface 109. Then, the vertical articulated robot 200 has the lower arm 208 and the upper arm 210 capable of rotating vertically with respect to the first axis 204. Also, in FIG. 2B, the range of motion B is shown as the range of movement of a manipulator attached to a distal end of the upper arm 210.

The range of motion B is determined by the range of motion of the second axis, the third axis, and the length of the arms. Here, the range of motion A on a left side of the illustrated vertical articulated robot 200 is an area where a robot can secure a wide operating range. This area is referred to as the primary operating range, and the direction facing the primary operating range is referred to as a front face of the robot.

Next, referring to FIG. 2A, the range of motion A of the vertical articulated robot 100 according to this embodiment becomes the range of motion B shown in FIG. 2B when turned 90 degrees in consideration of the first axis 110 being a horizontal axis. For comparison, the range of motion A in FIG. 2A is shown by dashed lines overlapping the range of motion B in FIG. 2B.

As can be seen from the range of motion A, the vertical articulated robot 100 has its primary operating range on the upper side of the robot and is set in a supine position. As a result, the pivot frame 112 is supported by the first axis 110 in a position in which the second axis 114 is positioned above the first axis 110 and the front face 116a of the lower arm 116 oriented upward. Also, the second axis 114 may be positioned directly above (riding on) the first axis 110.

In addition, in the vertical articulated robot 100, the front face 116a of the lower arm 116 oriented upward, which means that a wider motion range of the upper arm 120 relative to the lower arm 116 (i.e., the front side of the robot) is facing the opposite side (i.e., upward) of the mounting surface 109. On the other hand, the front face 208a of the lower arm 208 of the conventional vertical articulated robot 200 shown in FIG. 2B is facing forward.

Furthermore, by defining the upper side of the robot as the main operating range, the vertical articulated robot 100 tends to operate with the upper arm 120 and the lower arm 116 extended. Also, since the second axis 114 is positioned above the first axis 110, in this posture, when the first axis 110 rotates, it operates like a pendulum (see FIGS. 3 and 4), and the distal end 129 of the lower arm 116 does not interfere by protruding backwards, enabling installation in a narrow layout.

Figure 4:
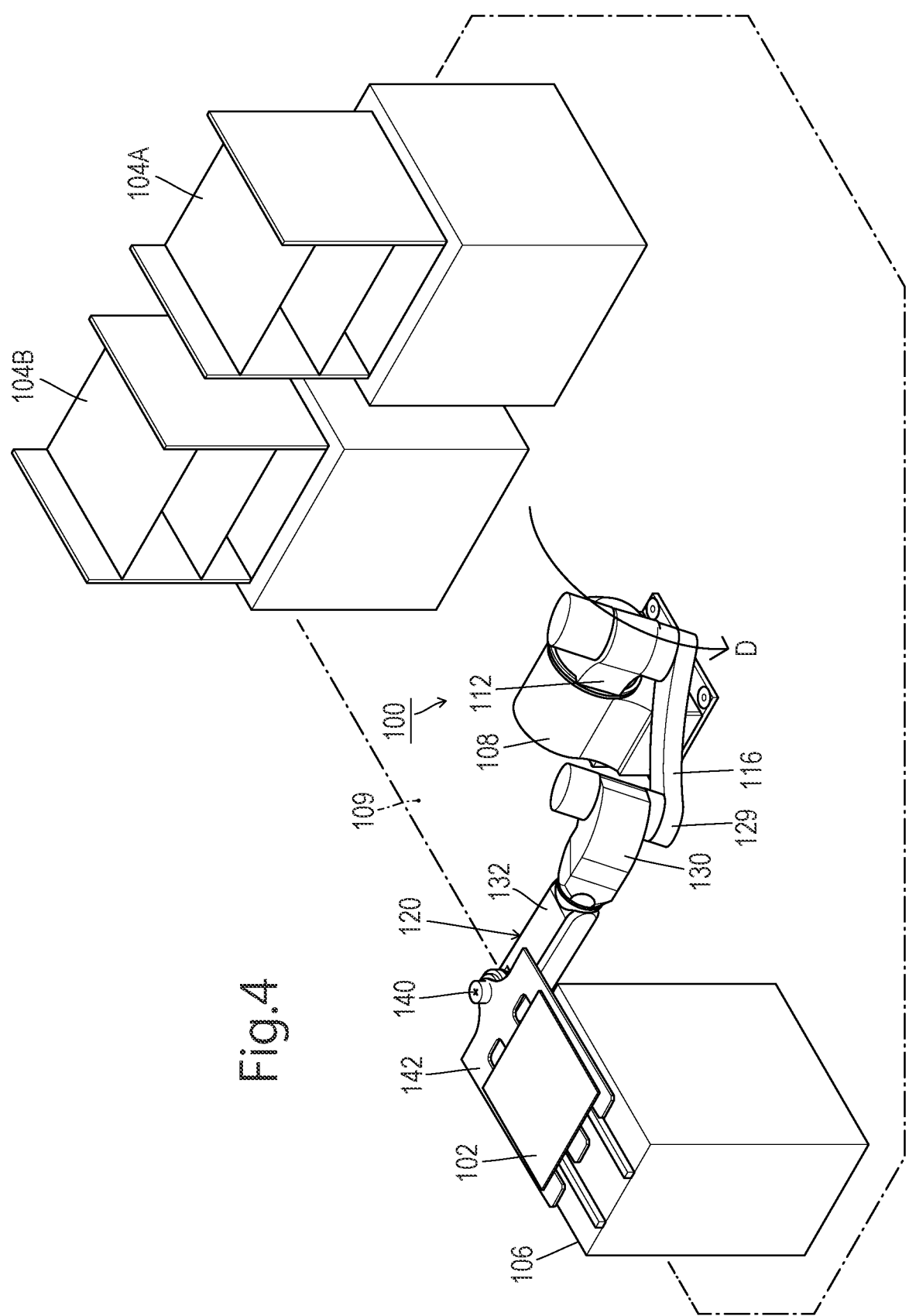
FIG. 4 is a diagram illustrating subsequent operation of the vertical articulated robot following FIG. 3.

FIG. 3 illustrates the operation of the vertical articulated robot 100 of FIG. 1, and FIG. 4 illustrates the operation of the subsequent vertical articulated robot 100. Here, the layout (arrangement) of the rack 104A, 104B, and the stage 106 is explained in a narrow situation where the work piece 102 stored in the rack 104A is transported to the stage 106.

The vertical articulated robot 100 is configured so that the axes and arms from the second axis 114 onward can perform substantially vertical circular motion with respect to the mounting surface 109 by the first axis 110. Therefore, by rotating the pivot frame 112 in the direction indicated by arrow C, the lower arm 116 and upper arm 120 approach the rack 104A, and then the axes from the second axis 114 onwards are appropriately rotated. As a result, the hand 142 attached to the upper arm 120 can be inserted under the work piece 102, and the work piece is placed on the hand 142.

Next, as shown in FIG. 4, by rotating the pivot frame 112 in the direction indicated by arrow D, the lower arm 116 and upper arm 120 are brought close to the stage 106, and then the axes from the second axis 114 onwards are appropriately rotated. As a result, the hand 142 attached to the upper arm 120 is moved onto the stage 106, and the work piece 102 can be transported to the stage 106.

The vertical articulated robot 100 can not only transport the work piece 102 stored in the rack 104A to the stage 106 but also transport the work piece 102 from the rack 104B to the stage 106 or transport the work piece 102 between the racks 104A and 104B.

When the pivot frame 112 is rotated in the directions indicated by arrows C and D, the axes and arms from the second axis 114 onwards are positioned above the mounting surface 109 (here, the floor surface). Therefore, when the hand 142 is rotated in one direction indicated by arrows C and D, the vicinity of the third axis 118 operates like a pendulum, and the distal end 129 of the lower arm 116 does not interfere by protruding backward. Due to the above-reason, there is no risk of the vicinity of the third axis 118 colliding with peripheral equipment such as the racks 104A, 104B, and the stage 106. Accordingly, with the vertical articulated robot 100, it is possible to move each arm in a narrow layout while securing a wide operating range.

Furthermore, in the vertical articulated robot 100, since the vertical articulated robot 100 employs a structure that only the first axis 110 is arranged horizontally and the pivot frame 112 rotates in a substantially vertical direction, the axes and arms from the second axis 114 onwards can maintain the structure of existing vertical articulated robots unchanged. Therefore, it is possible to reduce manufacturing costs with the vertical articulated robot 100 by standardizing parts, make it inexpensive, improve maintainability, and facilitate manufacturing.

Figure 5:
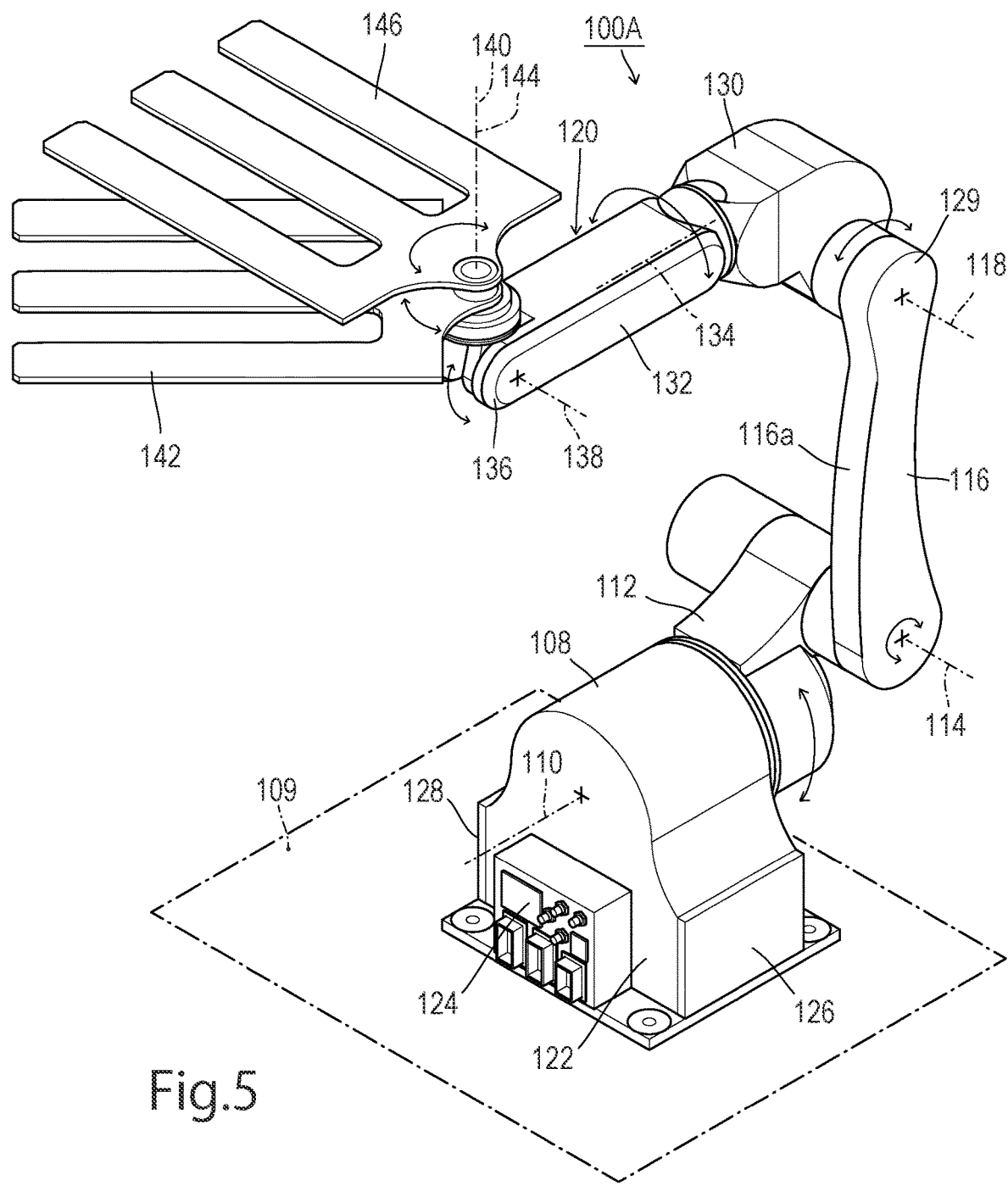
FIG. 5 is a diagram illustrating a variation of the vertical articulated robot in FIG. 1.

FIG. 5 shows an example of a modification of the vertical articulated robot 100 of FIG. 1. The vertical articulated robot 100A in the modified example is a seven-axis robot, and in addition to the hand 142 rotating by the sixth axis 140, a second hand 146 rotating by the seventh axis 144 coaxial with the sixth axis 140 is attached to the upper arm 120.

As a result, in the vertical articulated robot 100A, not only can each arm be moved in a small space, but cycle time can also be shortened by using two hands 142 and 146 as end effectors.

Additionally, since the vertical articulated robots 100 and 100A have a wider operating range than SCARA-type robots, the vertical articulated robots 100 and 100A can transport work pieces between multiple racks without using traveling devices, thereby reducing overall equipment costs.

Thus, while preferred embodiments of the present invention have been described with reference to the accompanying drawings, it should be understood that the present invention is not limited to substrate conveying applications. The present invention is a versatile vertical articulated structure robot that can be used for handling or loading applications in narrow layouts. It will be apparent to those skilled in the art that various modifications or variations can be contemplated within the scope of the claims, and these are also understood to fall within the technical scope of the present invention. For the purposes of the present disclosure, the term 'a' or 'an' entity refers to one or more of that entity. As such, the terms 'a' or 'an', 'one or more' and 'at least one' can be used interchangeably herein.

The invention claimed is:

1. A vertical articulated robot comprising:
a base installed on a mounting surface;
a first axis supported parallel to the mounting surface by the base;
a pivot frame rotatable by the first axis;
a second axis supported orthogonal to the first axis by the pivot frame;
a lower arm rotatable by the second axis;
a third axis supported parallel to the second axis by an end of the lower arm opposite to the second axis;
a connecting arm rotatable by the third axis;

a fourth axis supported orthogonal to the second axis and third axis by the connecting arm, and an upper arm including a holding arm rotatable by the fourth axis, the first axis, being parallel to the mounting surface, enables the pivot frame to rotate substantially vertically with respect to the mounting surface, and wherein the first axis enables the second axis, the lower arm, the third axis, and the upper arm to make a substantially vertical circular motion relative to the mounting surface.

2. The vertical articulated robot according to claim 1, wherein the pivot frame is supported by the first axis in a posture in which the second axis is positioned above the first axis and a front face of the lower arm is oriented upward.

* * * * *